(12) United States Patent
Yoon

(10) Patent No.: US 10,375,291 B2
(45) Date of Patent: Aug. 6, 2019

(54) CAMERA REGISTERING APPARATUS AND METHOD

(71) Applicant: Hanwha Techwin Co., Ltd., Seongnam-si (KR)

(72) Inventor: Hyun Kyoung Yoon, Changwon-si (KR)

(73) Assignee: HANWHA TECHWIN CO., LTD., Suwon-si (KR)

( * ) Notice: Subject to any disclaimer, the term of this patent is extended or adjusted under 35 U.S.C. 154(b) by 0 days.

(21) Appl. No.: 15/474,238

(22) Filed: Mar. 30, 2017

(65) Prior Publication Data

US 2018/0176449 A1   Jun. 21, 2018

(30) Foreign Application Priority Data

Dec. 15, 2016  (KR) .......................... 10-2016-0171666

(51) Int. Cl.
*H04N 7/18* (2006.01)
*H04L 12/10* (2006.01)
*H04N 5/232* (2006.01)

(52) U.S. Cl.
CPC ......... *H04N 5/23206* (2013.01); *H04L 12/10* (2013.01); *H04N 7/181* (2013.01)

(58) Field of Classification Search
CPC ..... H04L 12/10; H04N 5/23206; H04N 7/181
See application file for complete search history.

(56) References Cited

U.S. PATENT DOCUMENTS

| 6,259,443 | B1* | 7/2001 | Williams, Jr. ........ G06F 3/1423 348/E7.05 |
| 2004/0075740 | A1* | 4/2004 | Nagao ..................... H04N 7/181 348/143 |
| 2007/0217765 | A1* | 9/2007 | Itoh ........................... H04N 5/76 386/202 |
| 2008/0084473 | A1* | 4/2008 | Romanowich ... G08B 13/19671 348/135 |
| 2009/0190653 | A1* | 7/2009 | Seo ......................... H04N 5/765 375/240.01 |
| 2011/0267472 | A1* | 11/2011 | Kishi ................ H04L 12/40058 348/159 |
| 2015/0042812 | A1* | 2/2015 | Tang .................. H04N 5/23206 348/157 |
| 2015/0358575 | A1* | 12/2015 | Park ......................... H04N 5/77 386/224 |

FOREIGN PATENT DOCUMENTS

| JP | 4847165 B2 | 12/2011 |
| KR | 10-2006-0107487 A | 10/2006 |
| KR | 10-1521534 B1 | 5/2015 |
| KR | 10-1541218 B1 | 8/2015 |
| KR | 10-2015-0141095 A | 12/2015 |

\* cited by examiner

*Primary Examiner* — Amy R Hsu
(74) *Attorney, Agent, or Firm* — Sughrue Mion, PLLC

(57) ABSTRACT

Provided is a camera registering apparatus including: a power over Ethernet (PoE) port configured to receive a first camera registration request from a first camera forming a first network; a network port configured to receive a second camera registration request from a second camera forming a second network different from the first network; and a processor configured to, when an allocable channel exists, register the first camera or the second camera in the allocable channel according to an order of receiving the first camera registration request and the second camera registration request.

14 Claims, 9 Drawing Sheets

MANUAL ADDITION

| | |
|---|---|
| • CHANNEL | 3 ▼ |
| • PROTOCOL | UNKNOWN ▼ |
| • MODEL | UNKNOWN ▼ |
| • ADDRESS TYPE | UNKNOWN ▼ |
| • IP ADDRESS | ☐ . ☐ . ☐ . ☐ |
| • DEVICE PORT | ☐ (Max.65535) |
| • HTTP PORT | ☐ (Max.65535) |
| • ID | ☐ |
| • PASSWORD | ☐ |

[REGISTER] [END]

CAMERA REGISTERING APPARATUS AND METHOD

CROSS-REFERENCE TO THE RELATED APPLICATION

This application claims priority from Korean Patent Application No. 10-2016-0171666, filed on Dec. 15, 2016, in the Korean Intellectual Property Office, the disclosure of which is incorporated herein in its entirety by reference.

BACKGROUND

1. Field

Apparatuses and methods consistent with exemplary embodiments of the inventive concept relate to camera registration.

2. Description of the Related Art

Recently, cameras are increasingly installed inside or outside buildings and on streets for various purposes, such as crime prevention, security, and store management. Such cameras may perform a function as a network camera by being connected to each other through a network wirelessly or via wires.

Meanwhile, resource allocating technologies for allocating channels of a video recorder to the cameras connected through the network need to be diversified.

SUMMARY

Exemplary embodiments of the inventive concept provide a camera registering apparatus and method for user convenience.

Various aspects of the exemplary embodiments will be set forth in part in the description which follows and, in part, will be apparent from the description, or may be learned by practice of the presented embodiments.

According to one or more exemplary embodiments, there is provided a camera registering apparatus which may include: a power over Ethernet (PoE) port configured to receive a first camera registration request from a first camera forming a first network; a network port configured to receive a second camera registration request from a second camera forming a second network different from the first network; and a processor configured to, when an allocable channel exists, register the first camera or the second camera in the allocable channel according to an order of receiving the first camera registration request and the second camera registration request.

The first network may be a local area network (LAN) and the second network may be a wide area network (WAN).

The first camera registration request may include first channel identification information, the processor may be further configured to, when the first camera registration request is received before the second camera registration request, register the first camera in a first channel indicated by the first channel identification information and register the second camera in a second channel different from the first channel, and each of the first and second channels may be the allocable channel.

The first channel identification information may indicate a port number of the PoE port that receives the first camera registration request from the first camera, from among a plurality of PoE ports provided in the camera registering apparatus.

The first camera registration request may include first channel identification information indicating a first channel, the camera registering apparatus may further include a viewer port configured to transmit a registration confirmation request regarding the first channel for the first camera to a client terminal, and receive a registration affirmation response regarding the first channel for the first camera from the client terminal, and the processor may be further configured to, when the second camera registration request is received before the first camera registration request, register the second camera in the first channel, deregister the second camera from the first channel according to the registration affirmation response regarding the first channel for the first camera, and register the first camera in the first channel.

The viewer port may be further configured to receive a registration negation response regarding the first channel for the first camera from the client terminal, transmit a registration confirmation request regarding a second channel for the first camera to the client terminal, and receive a registration affirmation response regarding the second channel for the first camera from the client terminal, the processor may be further configured to register the first camera in the second channel according to a registration negation response regarding the first channel for the first camera and a registration affirmation response regarding the second channel for the first camera, and the second channel may be a channel different from the first channel.

The registration confirmation request regarding the second channel for the first camera may include identification information about at least one allocable channel, and the registration affirmation response regarding the second channel for the first camera may include a user input of selecting one of the at least one allocable channel.

The camera registering apparatus may further include a viewer port configured to receive certain channel identification information indicating a certain channel from a client terminal, transmit a camera detail information input request corresponding to the certain channel to the client terminal, and receive first camera detail information about the first camera or second camera detail information about the second camera from the client terminal, wherein the processor may be further configured to register the first camera or the second camera in the certain channel according to the certain channel identification information and the first camera detail information, or the certain channel identification information and the second camera detail information.

According to one or more exemplary embodiments, there is provided a camera registering method performed by a camera registration apparatus comprising a processor, a power over Ethernet (PoE) port, and a network port. The method may include: receiving, by the PoE port, a first camera registration request from a first camera forming a first network; receiving, by the network port, a second camera registration request from a second camera forming a second network different from the first network; and when an allocable channel exists, registering, by the processor, each of the first camera and the second camera in the allocable channel according to an order of receiving the first camera registration request and the second camera registration request.

The first network may be a local area network (LAN) and the second network may be a wide area network (WAN).

The first camera registration request may include first channel identification information, and the above method may further include: when the first camera registration request is received before the second camera registration request, registering, by the processor, the first camera in a first channel indicated by the first channel identification information; and registering, by the processor, the second camera in a second channel different from the first channel.

The first channel identification information may indicate a port number of the PoE port that receives the first camera registration request from the first camera, from among a plurality of PoE ports provided in the camera registering apparatus.

The first camera registration request may include first channel identification information indicating a first channel, and the above method may further include: when the second camera registration request is received before the first camera registration request, registering, by the processor, the second camera in the first channel, transmitting, by a viewer port provided in the camera registering apparatus, a registration confirmation request regarding the first channel for the first camera to a client terminal, receiving, by the viewer port, a registration affirmation response regarding the first channel for the first camera from the client terminal; and deregistering, by the processor, the second camera from the first channel and registering the first camera in the first channel.

The above method may further include: receiving, by the viewer port, a registration negation response regarding the first channel for the first camera from the client terminal; transmitting, by the viewer port, a registration confirmation request regarding a second channel for the first camera to the client terminal; receiving, by the viewer port, a registration affirmation response regarding the second channel for the first camera from the client terminal; and registering, by the processor, the first camera in the second channel, wherein the second channel may be a channel different from the first channel.

The registration confirmation request regarding the second channel for the first camera may include information about at least one allocable channel, and the registration affirmation response regarding the second channel for the first camera may include a user input of selecting one of the at least one allocable channel.

The above method may further include: receiving, by the viewer port, certain channel identification information from a client terminal; transmitting, by the viewer port, a camera detail information input request corresponding to a certain channel indicated by the certain channel identification information to the client terminal; receiving, by the viewer port, camera detail information about a certain camera corresponding to the certain channel from the client terminal; and registering, by the processor, the certain camera in the certain channel, wherein the certain camera may be the first camera or the second camera.

According to one or more exemplary embodiments, there is provided a camera registering apparatus which may include a processor and a plurality of ports configured to be connected to a plurality of cameras through a plurality of channels. Here, the processor may be configured to receive a plurality of signals for registering the cameras to the channels, from the cameras and a client terminal connected to one of the ports, wherein at least one of the signals includes channel identification information indicating one of the channels and one of the cameras to be registered in the one of the channels.

The processor may be further configured to register a camera in a channel having the highest priority among the channels in response to one of the ports receiving a signal among the signals which comprises channel identification information indicating the channel and camera identification information indicating the camera. The processor may also be configured to, in response to the one of the ports receiving the signal, register the camera in the channel after deregistering another camera among the cameras from the channel, the other camera having been registered in the channel in response to another one of the ports receiving another signal requesting registration of the other camera without indicating any of the channels.

BRIEF DESCRIPTION OF THE DRAWINGS

These and/or other aspects will become apparent and more readily appreciated from the following description of the embodiments, taken in conjunction with the accompanying drawings in which:

FIGS. 8A and 8B are diagrams for describing a camera registering method according to exemplary embodiments.

DETAILED DESCRIPTION

Figure 1:
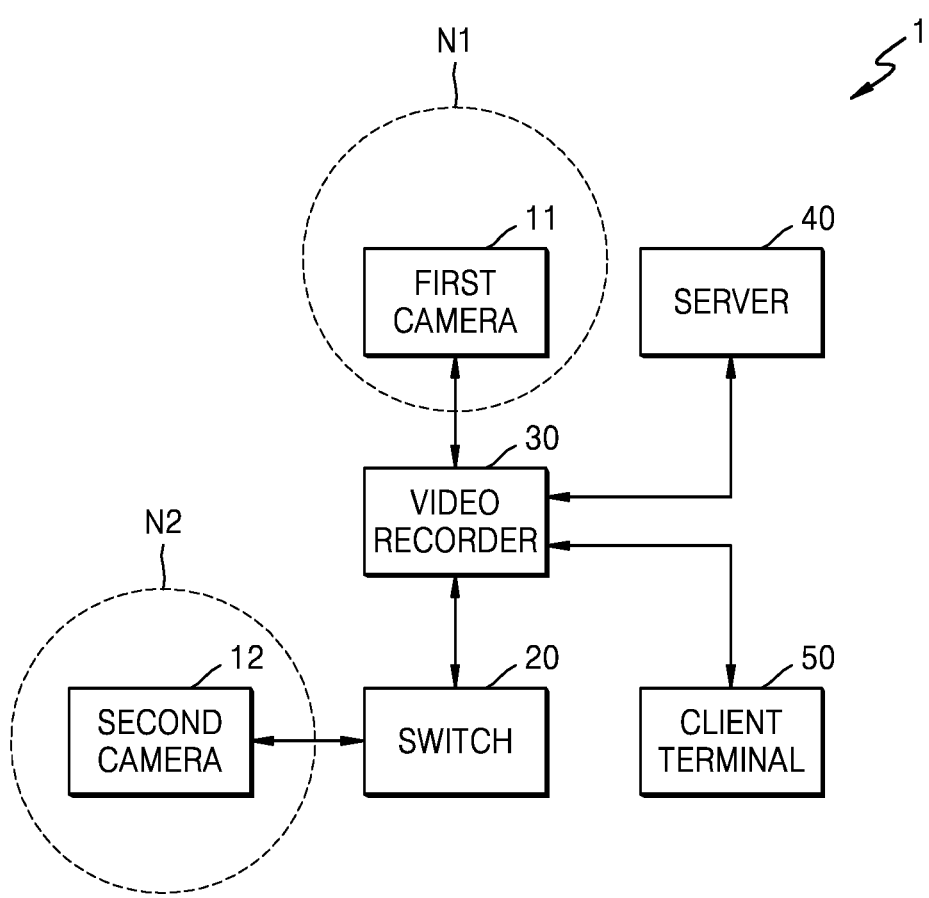
FIG. 1 is a block diagram of a surveillance system according to an exemplary embodiment.

As the inventive concept allows for various changes and numerous embodiments, particular exemplary embodiments will be illustrated in the drawings and described in detail in the written description. However, this is not intended to limit the inventive concept to particular modes of practice, and it will to be appreciated that all changes, equivalents, and substitutes that do not depart from the spirit and technical scope of the inventive concept are encompassed in the inventive concept. In the description of the exemplary embodiments, certain detailed explanations of related art are omitted when it is deemed that they may unnecessarily obscure the essence of the inventive concept.

While such terms as "first", "second", etc., may be used to describe various components, such components must not be limited to the above terms. The above terms are used only to distinguish one component from another.

The terms used in the present specification are merely used to describe particular embodiments, and are not intended to limit the inventive concept. An expression used in the singular encompasses the expression in the plural, unless it has a clearly different meaning in the context.

In the present specification and claims, it is to be understood that terms such as "including" or "having", etc., are intended to indicate the existence of the features, numbers, steps, actions, components, parts, or combinations thereof disclosed therein, and are not intended to preclude the possibility that one or more other features, numbers, steps, actions, components, parts, or combinations thereof may exist or may be added.

As used herein, the term "and/or" includes any and all combinations of one or more of the associated listed items. Expressions such as "at least one of," when preceding a list of elements, modify the entire list of elements and do not modify the individual elements of the list.

The exemplary embodiments described herebelow may be described in terms of functional block components and various processing steps. Such functional blocks may be realized by any number of hardware and/or software components configured to perform the specified functions. For example, the functional blocks may employ various integrated circuit components, e.g., memory elements, processing elements, logic elements, look-up tables, and the like, which may carry out a variety of functions under the control of one or more microprocessors or other control devices. Similarly, where the functional blocks are implemented using software programming or software elements, they may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the functional blocks could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Hereinafter, exemplary embodiments of the inventive concept will be described with reference to accompanying drawings.

FIG. 1 is a block diagram of a surveillance system 1 according to an exemplary embodiment.

Referring to FIG. 1, the surveillance system 1 according to an exemplary embodiment includes a first network N1, a second network N2, a first camera 11, a second camera 12, a switch 20, a video recorder 30, a server 40, and a client terminal 50.

The surveillance system 1 may monitor a plurality of regions through a plurality of cameras. In other words, the surveillance system 1 may monitor different regions through the first network N1 and the second network N2 that is different from the first network N1. Here, the first network N1 may be a local area network (LAN) and the second network N2 may be a wide area network (WAN).

The first camera 11 may be a camera forming the first network N1, and the second camera 12 may be a camera forming the second network N2. There may be at least one first camera 11 in the first network N1, and at least one second camera 12 in the second network N2.

The first and second cameras 11 and 12 each obtain an image of a surveillance region by photographing the surveillance region. The first and second cameras 11 and 12 may each photograph the surveillance region in real-time for surveillance or security. The first and second cameras 11 and 12 may each be a PTZ camera capable of pan, tilt, and zoom movements.

The first and second cameras 11 and 12 may each be a low power camera driven by a battery. A low power camera usually maintains a sleep mode, and wakes up periodically to determine whether an event is generated. When it is determined that the event is generated, the low power camera switches to an active mode, and when it is determined that the event is not generated, the low power camera returns back to the sleep mode. As such, the low power camera has low power consumption by maintaining the active mode only when the event is generated.

The first camera 11 may be connected to the video recorder 30 through a power over Ethernet (PoE) port 111 (see FIG. 2) of the video recorder 30. The first camera 11 may communicate with the video recorder 30 through the PoE port 111 of the video recorder 30. Also, the first camera 11 may receive power through the PoE port 111 of the video recorder 30.

The second camera 12 may be connected to the video recorder 30 through a network port 112 (see FIG. 2) of the video recorder 30. For example, the second camera 12 may be connected to the video recorder 30 through the switch 20 connected to the network port 112 of the video recorder 30. Here, there may be at least one second camera 12 connectable to one video recorder 30 through one switch 20. Accordingly, the video recorder 30 may add the second network N2 through the switch 20. Also, the second camera 12 may receive power through the switch 20.

The video recorder 30 may record image information received from each of the first and second cameras 11 and 12, and transmit the recorded image information to at least one of the server 40 and the client terminal 50.

The video recorder 30 may allocate a channel to the first camera 11 connected through the PoE port 111 to register the first camera 11. The video recorder 30 may record the image information received from the first camera 11, and transmit the recorded image information to at least one of the server 40 and the client terminal 50.

The video recorder 30 may allocate a channel to the second camera 12 connected through the network port 112 to register the second camera 12. The video recorder 30 may record the image information received from the second camera 12, and transmit the recorded image information to at least one of the server 40 and the client terminal 50.

Figure 2:
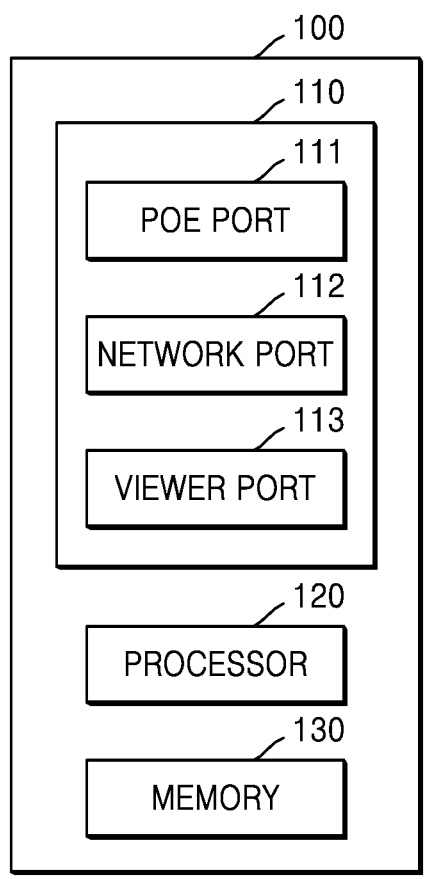
FIG. 2 is a block diagram of a camera registering apparatus according to an exemplary embodiment.

One or more channels for the first and second cameras 11 and 12 may be allocated by a camera registering apparatus 100 (see FIG. 2). The camera registering apparatus 100 may be included in the video recorder 30 or may be provided separately from the video recorder 30. The camera registering apparatus 100 included in the video recorder 30 will be described with reference to FIG. 2, and details thereof may also be applied to the camera registering apparatus 100 provided separately from the video recorder 30.

The server 40 may transmit image information received from at least one video recorder 30 to the client terminal 50. The server 40 may transmit a request for image information received from the client terminal 50 to at least one video recorder 30.

The client terminal 50 may display or store information including video information received from the video recorder 30 or the server 40. For example, the client terminal 50 may execute a web viewer application to display, on a screen, image information received from the video recorder 30 through a viewer port 113 (see FIG. 2).

The client terminal 50 may include at least one processor. The client terminal 50 may be driven in a form of being included in another hardware apparatus, such as a microprocessor or a general-purpose computer system. The client terminal 50 may be a personal computer (PC) or a mobile terminal such as a smartphone or a tablet.

The video recorder 30 and the server 40, the video recorder 30 and the client terminal 50, and/or the server 40 and the client terminal 50 may communicate with each other through a 2nd generation (2G) or 3G cellular communication system, 3G partnership project (3GPP), a 4G communication system, long-term evolution (LTE), or world interoperability for microwave access (WiMAX), not being limited thereto.

FIG. 2 is a block diagram of the camera registering apparatus 100 according to an exemplary embodiment.

Referring to FIG. 2, the camera registering apparatus 100 according to an exemplary embodiment includes a communication interface 110, a processor 120, and a memory 130.

The communication interface 110 may include the PoE port 111, the network port 112, and the viewer port 113. The PoE port 111, the network port 112, and the viewer port 113 may be physically separated components. Meanwhile, the PoE port 111, the network port 112, and the viewer port 113 may be functionally separated components.

The PoE port 111 may be a power supply port for a connection with the first camera 11. There may be at least one PoE port 111. Here, one PoE port 111 may be connected to one first camera 11 through one cable.

Meanwhile, the PoE port 111 receives a first camera registration request from the first camera 11 forming the first network N1.

The first camera registration request may include at least one of first channel identification information and first camera identification information.

The first channel identification information may indicate a port number of the PoE port 111 that receives the first camera registration request from the first camera 11, from among a plurality of PoE ports included in the video recorder 30. For example, the first channel identification information may include '1' that is the port number of the PoE port 111 to which the first camera 11 is connected through a cable, from among eight (8) PoE ports included in the video recorder 30.

The network port 112 may be a port for a connection with the second camera 12. There may be at least one network port 112. Here, one network port 112 may be connected to one switch 20 through one cable.

Meanwhile, the network port 112 receives a second camera registration request from the second camera 12 forming the second network N2 different from the first network N1. The second camera registration request may include at least one of second camera identification information and switch identification information.

The viewer port 113 may be a port for a connection with the client terminal 50.

The viewer port 113 may transmit a registration confirmation request regarding a certain channel for a certain camera to the client terminal 50, and receive a registration affirmation response or a registration negation response regarding the certain channel for the certain camera from the client terminal 50.

For example, the viewer port 113 may transmit a registration confirmation request regarding the first channel for the first camera 11 to the client terminal 50, and receive a registration affirmation response regarding the first channel for the first camera 11 from the client terminal 50.

The viewer port 113 may transmit the registration confirmation request regarding the first channel for the first camera 11 to the client terminal 50, receive a registration negation response regarding the first channel for the first camera 11 from the client terminal 50, transmit a registration confirmation request regarding a second channel for the first camera 11 to the client terminal 50, and receive a registration affirmation response regarding the second channel for the first camera 11 from the client terminal 50. The second channel may be a channel different from the first channel.

Here, the registration confirmation request regarding the second channel for the first camera 11 may include information, such as identification information, regarding at least one allocable channel, and the registration affirmation response regarding the second channel for the first camera 11 may include a user input of selecting one of the at least one allocable channel.

Meanwhile, the viewer port 113 may receive certain channel identification information from the client terminal 50, transmit a camera detail information input request corresponding to a certain channel to the client terminal 50, and receive first camera detail information about the first camera 11 or second camera detail information about the second camera 12 from the client terminal 50.

The processor 120 controls overall operations of the camera registering apparatus 100.

When an allocable channel exists, the processor 120 registers the first camera 11 or the second camera 12 in the allocable channel according to an order of receiving the first and second camera registration requests. Here, the first camera registration request may be received through the PoE port 111, and the second camera registration request may be received through the network port 112. The first camera registration request may include the first channel identification information indicating the first channel.

The allocable channel is a channel in which a camera is not registered or from which a camera is deregistered. When at least one of the first and second camera registration requests is received, the processor 120 may determine whether an allocable channel exists. Hereinafter, it is assumed that the first and second channels are included in allocable channels.

According to an exemplary embodiment, when the first camera registration request is received before the second camera registration request, the processor 120 may register the first camera 11 in the first channel indicated by the first channel identification information, and register the second camera 12 in the second channel different from the first channel.

Meanwhile, when the second camera registration request is received before the first camera registration request, the processor 120 may register the second camera 12 in the first channel, deregister the second camera 12 from the first channel according to a registration confirmation response regarding the first channel for the first camera 11, and register the first camera 11 in the first channel. Here, the registration affirmation response regarding the first channel for the first camera 11 may be received from the client terminal 50.

However, the processor 120 may register the first camera 11 in the second channel according to a registration negation response regarding the first channel for the first camera 11 and a registration affirmation response regarding the second channel for the first camera 11. Here, the registration negation response regarding the first channel for the first camera 11 and the registration affirmation response regarding the second channel for the first camera 11 may be received from the client terminal 50.

According to another exemplary embodiment, when the second camera registration request is received before the first camera registration request, the processor 120 may register the second camera 12 in the first channel according to the second camera registration request, deregister the second camera 12 from the first channel according to the first camera registration request including the first channel identification information indicating the first channel, and then register the first camera 11 in the first channel.

As such, the processor 120 may prioritize registration of the first camera 11 before registration of the second camera 12. As a result, according to the exemplary embodiment, registration of a camera in which a channel is specified has a priority over registration of a camera in which a channel is not specified, thereby providing the surveillance system 1 according to user's intention.

Meanwhile, the processor 120 may register the first or second camera 11 or 12 in a certain channel according to certain channel identification information and first camera detail information, or certain channel identification information and second camera detail information. The certain channel identification information and the first camera detail information, and/or the certain channel identification information and the second camera detail information may be received from the client terminal 50.

As such, user convenience may be provided when the processor 120 allocates a channel selected by a user to a camera selected by the user.

The memory 130 stores information received by the camera registration apparatus 100 and information transmitted by the camera registration apparatus 100. The memory 130 may match and store camera identification information and channel identification information. For example, the memory 130 may match and store camera identification information of the first camera 11 and channel identification information of a channel allocated to a camera indicated by the camera identification information.

Hereinafter, details overlapping those described above will not be provided again or will be briefed.

FIGS. 3 through 7 are flowcharts of a camera registering method according to exemplary embodiments.

Figure 8A:
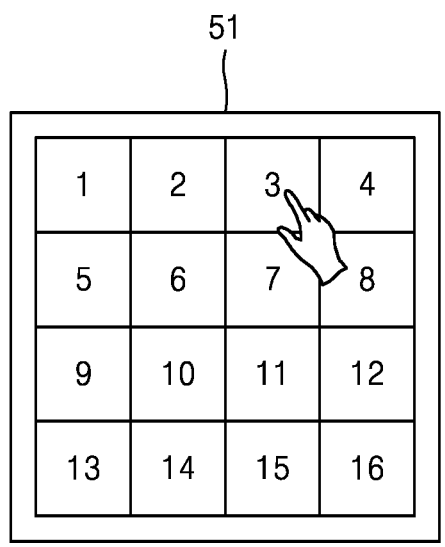

FIGS. 8A and 8B are diagrams for describing a camera registering method according to exemplary embodiments.

Figure 3:
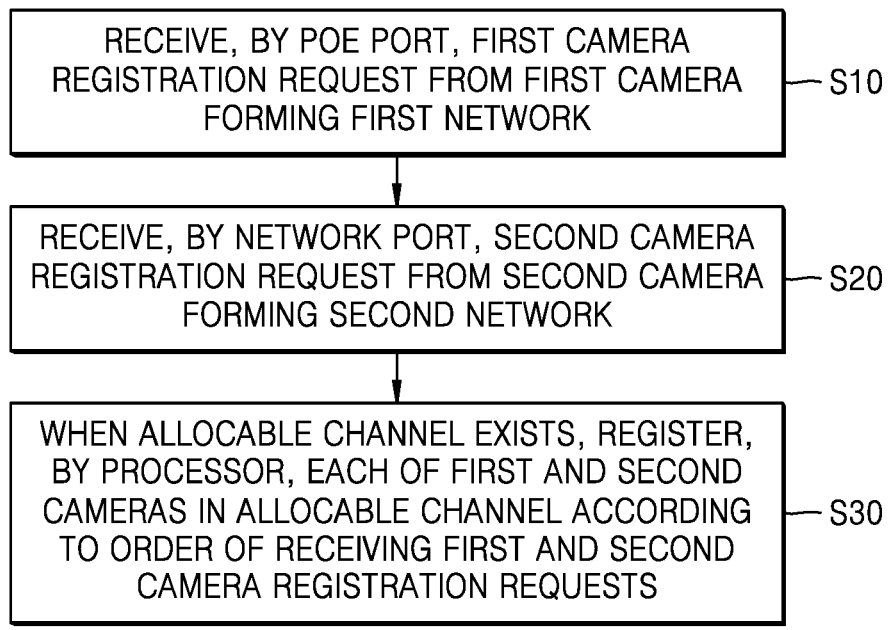
FIGS. 3 through 7 are flowcharts of a camera registering method according to exemplary embodiments.

Referring to FIG. 3, the camera registering apparatus 100 according to an exemplary embodiment receives the first camera registration request from the first camera 11 forming the first network N1, at the PoE port 111, in operation S10. Here, the first camera registration request may include the first channel identification information. Here, the first network may be a local area network (LAN) and the second network may be a wide area network (WAN).

Also, the camera registration apparatus 100 may receive the second camera registration request from the second camera 12 forming the second network N2, by the network port 112, in operation S20.

Then, when an allocable channel exists, the camera registration apparatus 100 registers the first camera 11 or the second camera 12 in the allocable channel according to an order of receiving the first and second camera registration requests, by the processor 120, in operation S30.

Hereinafter, the surveillance system 1 including the video recorder 30 including the camera registering apparatus 100 will be described in detail with reference to FIGS. 4 through 8B.

Figure 4:
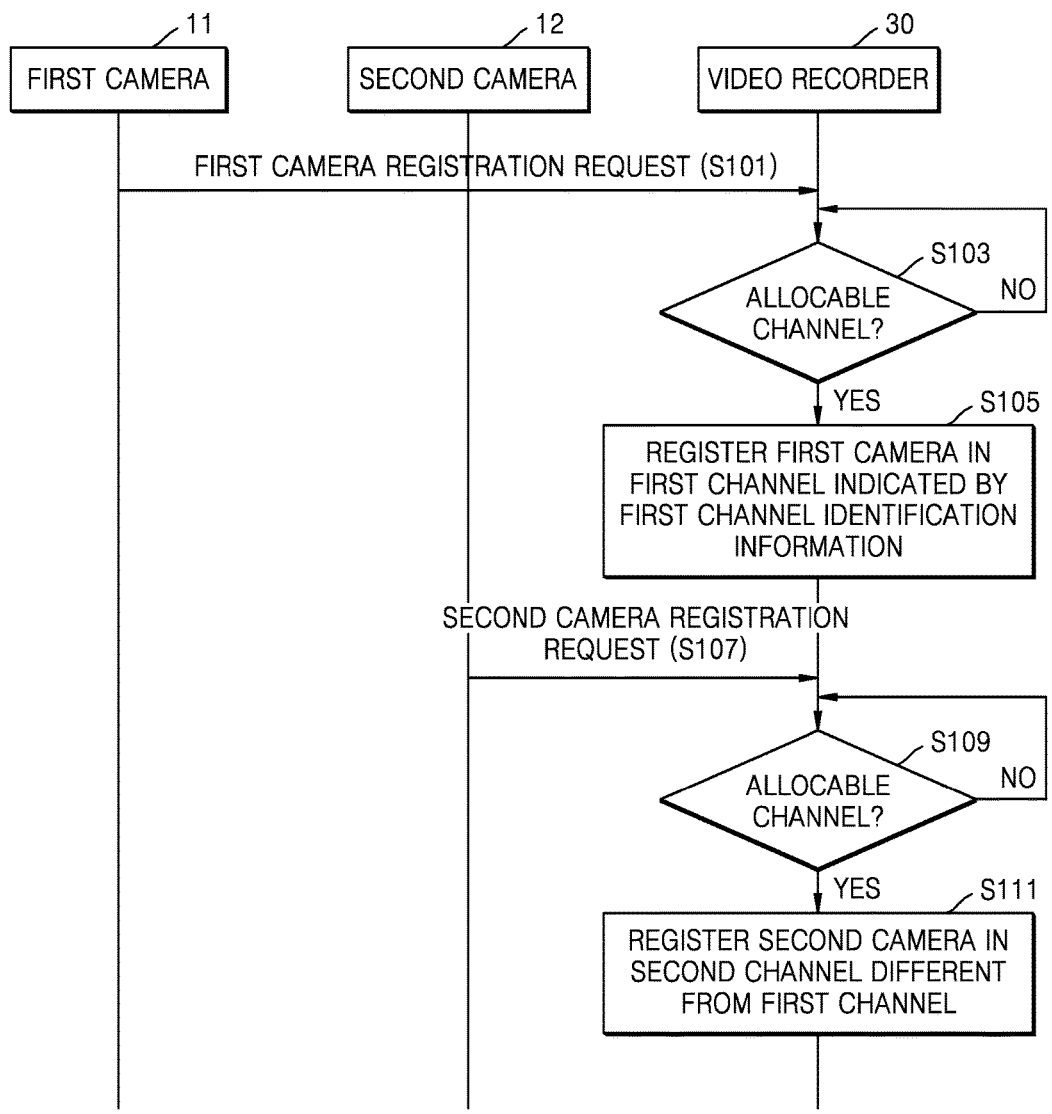

Referring to FIG. 4, the video recorder 30 receives the first camera registration request from the first camera 11 in operation S101.

The video recorder 30 determines whether an allocable channel exists correspondingly to the first camera registration request, in operation S103. Here, the first camera registration request may include the first channel identification information. The first channel identification information may indicate the port number of the PoE port 111 that receives the first camera registration request from the first camera 11, from among the plurality of PoE ports.

When the allocable channel exists, the video recorder 30 registers the first camera 11 in the first channel indicated by the first channel identification information, in operation S105.

Then, the video recorder 30 receives the second camera registration request from the second camera 12, in operation S107.

The video recorder 30 determines whether an allocable channel exists in response to the second camera registration request, in operation S109.

When the allocable channel exists, the video recorder 30 registers the second camera 12 in the second channel different from the first channel, in operation S111.

Operations S103, S105, S109, and S111 of FIG. 4 may correspond to operation S30 of FIG. 3.

As such, when the first camera registration request is received before the second camera registration request, the video recorder 30 may register the first camera 11 in the first channel indicated by the first channel identification information, and register the second camera 12 in the second channel different from the first channel, thereby providing the intuitive surveillance system 1 to the user.

Figure 5:
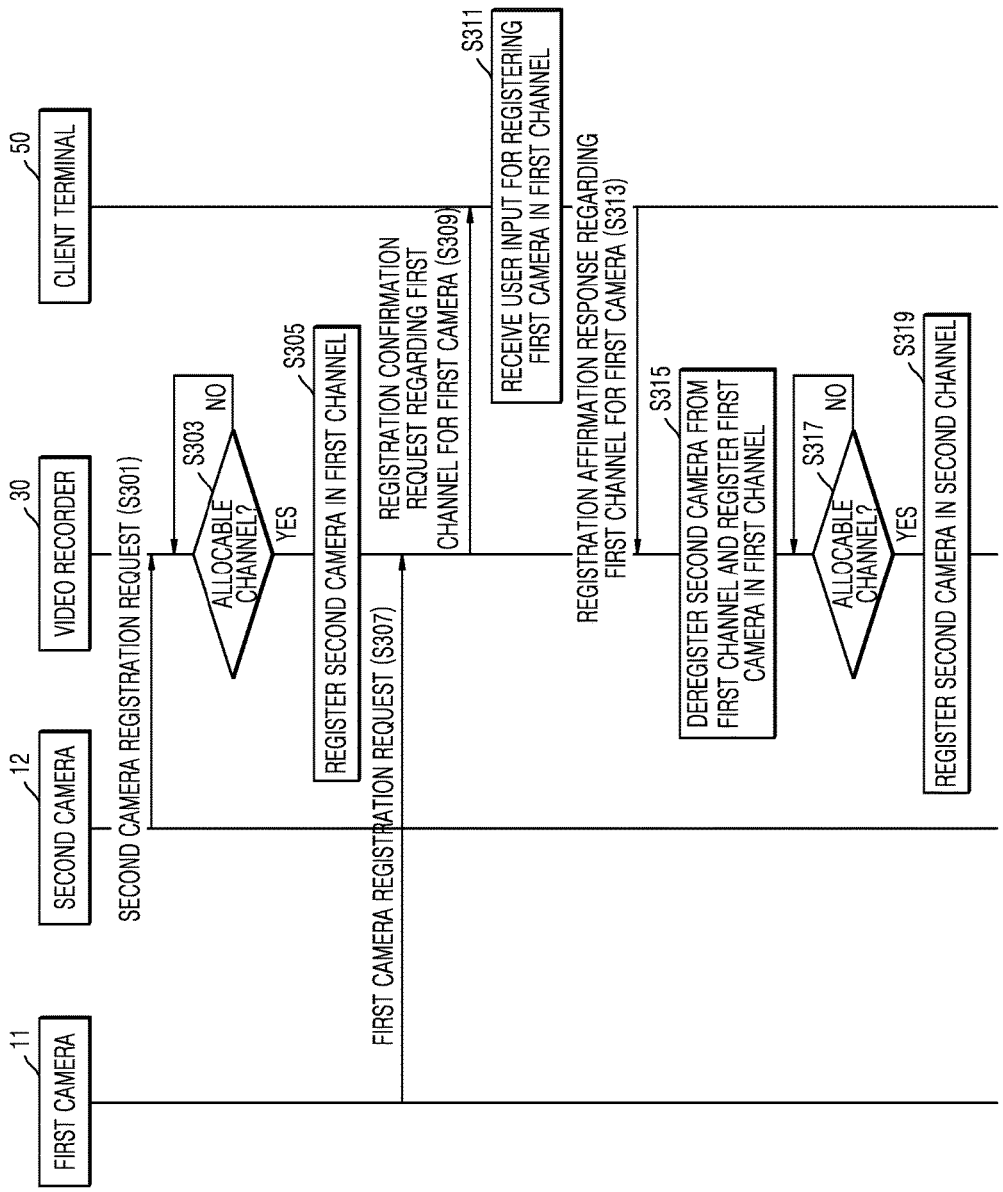

Referring to FIG. 5, the video recorder 30 first receives the second camera registration request from the second camera 12, in operation S301.

The video recorder 30 determines whether an allocable channel exists in response to the second camera registration request, in operation S303.

When the allocable channel exists, the video recorder 30 registers the second camera 12 in the first channel, in operation S305. Here, the first channel may be a channel number having a top priority from among allocable channels.

Then, the video recorder 30 receives the first camera registration request from the first camera 11 in operation S307. Here, the first camera registration request may include the first channel identification information indicating the first channel.

However, since the first channel is allocated to the second camera 12 through operation S305, the video recorder 30 transmits a registration confirmation request regarding the first channel for the first camera 11 to the client terminal 50, in operation S309.

The client terminal 50 receives a user input for registering the first camera 11 in the first channel, in operation S311.

Then, the video recorder 30 receives a registration affirmation response regarding the first channel for the first camera 11 from the client terminal 50, in operation S313.

According to the registration affirmation response regarding the first channel for the first camera 11, the video recorder 30 deregisters the second camera 12 from the first channel and registers the first camera 11 in the first channel, in operation S315. In other words, the video recorder 30 may match the port number of the PoE port 111 and the channel identification information, i.e., a channel number of a selected channel such as the first channel, according to a user selection.

Meanwhile, the video recorder 30 determines whether an allocable channel exists in operation S317. The video recorder 30 may determine whether an allocable channel exists according to the deregistration of the second camera 12 from the first channel. Here, the first channel in which the first camera 11 is registered may be excluded from the allocable channel.

When the allocable channel exists, the video recorder 30 registers the second camera 12 in the second channel, in operation S319. Here, the second channel may be a channel number having a top priority from among the allocable channels except the first channel.

Operations S303, S305, S309 through S319 of FIG. 5 may correspond to operation S30 of FIG. 3.

As such, even when the second camera registration request is received before the first camera registration request, and thus, the second camera is registered in the first channel, the video recorder 30 may deregister the second camera 12 from the first channel and register the first camera 11 in the first channel according to the user selection, thereby providing the intuitive surveillance system 1 to the user.

Figure 6:
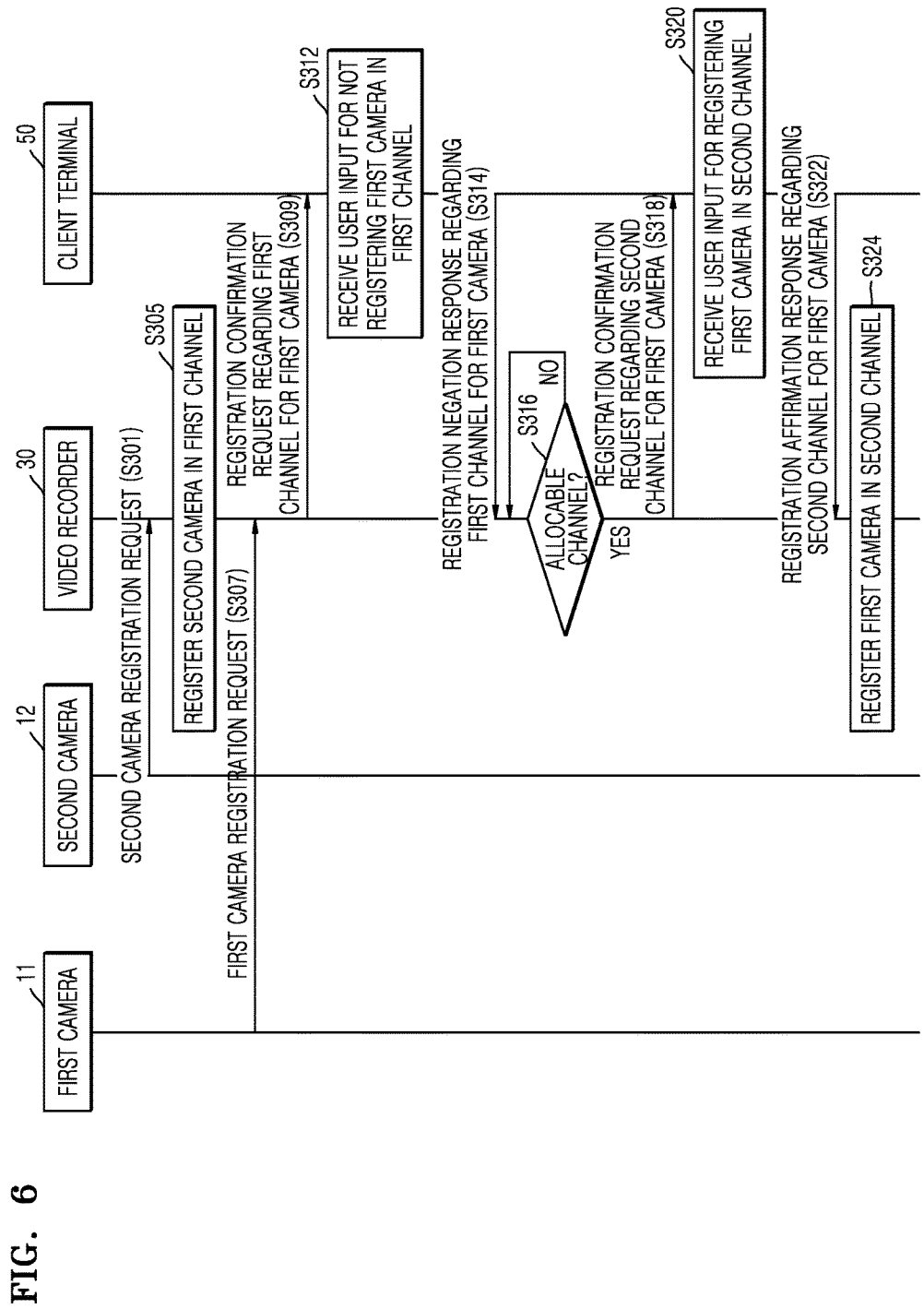

Referring to FIG. 6, the video recorder 30 receives the second camera registration request from the second camera 12, in operation S301.

When an allocable channel exists, the video recorder 30 registers the second camera 12 in the first channel in operation S305.

Then, the video recorder 30 receives the first camera registration request from the first camera 11 in operation S307.

Then, the video recorder 30 transmits a registration confirmation request regarding the first channel for the first camera 11 to the client terminal 50, in operation S309.

Meanwhile, the client terminal 50 receives a user input for not registering the first camera 11 in the first channel, in operation S312.

Then, the video recorder 30 receives a registration negation response regarding the first channel for the first camera 11 from the client terminal 50, in operation S314.

The video recorder 30 determines whether an allocable channel exists in operation S316. The video recorder 30 may determine whether an allocable channel exists in response to the registration negation response regarding the first channel for the first camera 11. Here, the first channel in which the second camera 12 is registered may be excluded from the allocable channel.

Then, the video recorder 30 transmits a registration confirmation request regarding the second channel for the first camera 11 to the client terminal 50, in operation S318. The second channel may be a channel different from the first channel. Here, the second channel may be a channel number having a top priority from among the allocable channels.

The client terminal 50 receives a user input for registering the first camera 11 in the second channel, in operation S320.

Then, the video recorder 30 receives a registration affirmation response regarding the second channel for the first camera 11 from the client terminal 50, in operation S322.

Then, the video recorder 30 registers the first camera 11 in the second channel according to the registration affirmation response regarding the second channel for the first camera 11, in operation S324.

Meanwhile, the registration confirmation request regarding the second channel for the first camera 11 may include channel identification information regarding at least one allocable channel. Here, the user input for registering the first camera 11 in the second channel may be a user input of selecting one of the at least one allocable channel. Also, the registration affirmation response regarding the second channel for the first camera 11 may be a registration affirmation response regarding one of the at least one allocable channel for the first camera 11. Accordingly, the video recorder 30 may register the first camera 11 in one of the at least one allocable channel.

Operations S305 and S309 through S324 of FIG. 6 may correspond to operation S30 of FIG. 3.

As such, when the second camera registration request is received before the first camera registration request, the video recorder 30 may register the first camera 11 in the second channel according to a user selection to provide user convenience.

Figure 7:
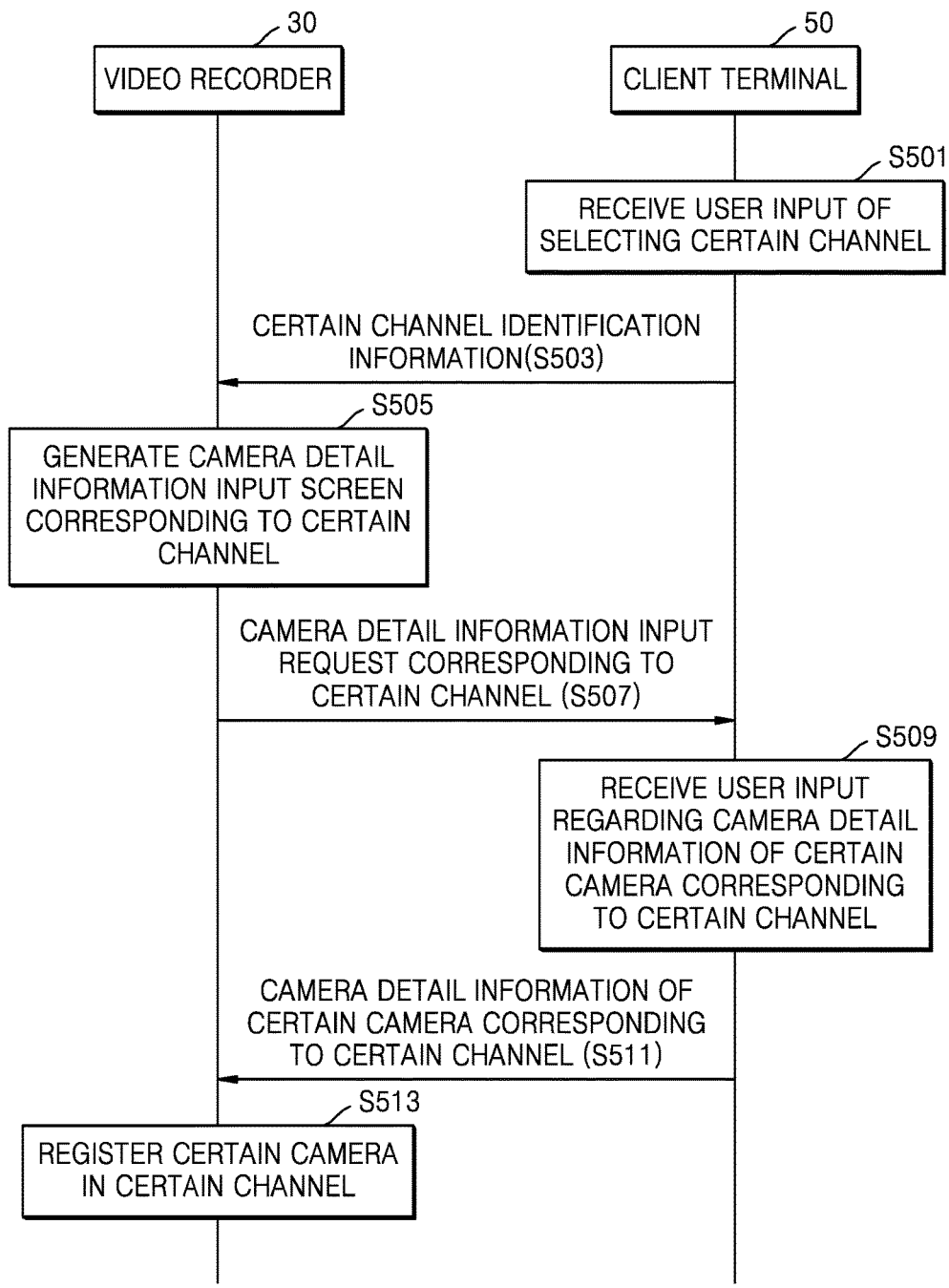

Referring to FIG. 7, the client terminal 50 receives a user input of selecting a certain channel, in operation S501. Referring to FIG. 8A, the client terminal 50 may display, on a display 51, a 16 split surveillance screen for displaying image information received from 16 cameras through 16 channels. For example, the client terminal 50 may receive a user input of selecting a third surveillance screen. Here, the third surveillance screen may be a sub-screen displaying image information received through a channel 3.

Referring back to FIG. 7, the video recorder 30 receives certain channel identification information from the client terminal 50 in operation S503. The certain channel identification information may include, for example, channel number 3.

The video recorder 30 generates a camera detail information input screen corresponding to the certain channel indicated by the certain channel identification information, in operation S505. The camera detail information input screen corresponding to the certain channel may be a camera detail information input screen corresponding to the channel 3.

Then, the video recorder 30 transmits a camera detail information input request corresponding to the certain channel to the client terminal 50, in operation S507. The camera detail information input request may include information indicating the camera detail information input screen corresponding to the certain channel. For example, the camera detail information input request may include information indicating the camera detail information input screen corresponding to the channel 3.

The client terminal 50 receives a user input regarding camera detail information of a certain camera corresponding to the certain channel, according to the camera detail information input request, in operation S509.

Referring to FIG. 8B, the client terminal 50 may display, on the display 51, the camera detail information input screen corresponding to the certain channel. The camera detail information input screen corresponding to the certain channel may be the camera detail information input screen corresponding to the channel 3. The user may input, through the camera detail information input screen corresponding to the channel 3, camera detail information, such as a protocol, model, address type, internet protocol (IP) address, device port, HTTP port, camera identification, and camera password of the certain camera. The certain camera may be the first or second camera 11 or 12.

Referring back to FIG. 7, the video recorder 30 receives the camera detail information of the certain camera corresponding to the certain channel, from the client terminal 50 in operation S511. For example, the video recorder 30 may receive first camera detail information about the first camera 11 corresponding to the channel 3 from the client terminal 50. The video recorder 30 may receive second camera detail information about the second camera 12 corresponding to the channel 3 from the client terminal 50.

Then, the video recorder 30 registers the certain camera in the certain channel in operation S513. For example, the video recorder 30 may register the first camera 11 in the channel 3 according to the first camera detail information about the first camera 11 corresponding to the channel 3. The video recorder 30 may register the second camera 12 in the channel 3 according to the second camera detail information about the second camera 12 corresponding to the channel 3.

As such, the video recorder 30 specifies a channel by a user input of selecting a sub-screen displayed on a surveillance screen of the client terminal 50, and registers a camera in the specified channel by a user input of manually adding the camera through the client terminal 50, thereby providing the intuitive surveillance system 1 to the user.

According to one or more exemplary embodiments, a surveillance system according to user's intention may be provided when registration of a camera in which a channel is specified has a priority over registration of a camera in which a channel is not specified.

Also, according to one or more exemplary embodiments, a user's intention may be reflected during camera registration by enabling the user to determine the registration of the camera in which a channel is not specified, which has a lower priority than the registration of the camera in which a channel is specified.

Also, according to one or more exemplary embodiments, user convenience may be provided by allocating a channel selected by the user to a camera selected by the user.

Also, according to one or more exemplary embodiments, an intuitive surveillance system may be provided to the user.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the drawings, it will be understood by those of ordinary skill in the art that various changes in form and details may be made therein without departing from the spirit and scope of the inventive concept as defined by the following claims.

What is claimed is:

1. A camera registering apparatus comprising:
a power over Ethernet (PoE) port configured to receive a first camera registration request from a first camera forming a first network;
a network port configured to receive a second camera registration request from a second camera forming a second network different from the first network; and
a processor configured to, when an allocable, channel exists, register the first camera or the second camera in the allocable channel according to an order of receiving the first camera registration request and the second camera registration request,
wherein the first camera registration request comprises first channel identification information indicating a first channel,
wherein the camera registering apparatus further comprises a viewer port configured to transmit a registration confirmation request regarding the first channel for the first camera to a client terminal, and receive a registration affirmation response regarding the first channel for the first camera from the client terminal, and
wherein the processor is further configured to, in response to receiving the second camera registration request prior to the first camera registration request, register the second camera in the first channel, deregister the second camera from the first channel according to the registration affirmation response regarding the first channel for the first camera, and register the first camera in the first channel.

2. The camera registering apparatus of claim 1, wherein the viewer port is further configured to receive a registration negation response regarding the first channel for the first camera from the client terminal, transmit a registration confirmation request regarding a second channel for the first camera to the client terminal, and receive a registration affirmation response regarding the second channel for the first camera from the client terminal,
wherein the processor is further configured to register the first camera in the second channel according to a registration negation response regarding the first channel for the first camera and a registration affirmation response regarding the second channel for the first camera, and
wherein the second channel is a channel different from the first channel.

3. The camera registering apparatus of claim 2, wherein the registration confirmation request regarding the second channel for the first camera comprises information about at least one allocable channel, and
wherein the registration affirmation response regarding the second channel for the first camera comprises a user input of selecting one of the at least one allocable channel.

4. The camera registering apparatus of claim 1, wherein the first network is a local area network (LAN) and the second network is a wide area network (WAN).

5. The camera registering apparatus of claim 1, wherein the first camera registration request comprises first channel identification information, wherein the processor is further configured to, in response to receiving the first camera registration request prior to the second camera registration request, register the first camera in a first channel indicated by the first channel identification information, and register the second camera in a second channel different from the first channel, and wherein each of the first and second channels is the allocable channel.

6. The camera registering apparatus of claim 5, wherein the first channel identification information indicates a port number of the PoE port that receives the first camera registration request from the first camera, from among a plurality of PoE ports provided in the camera registering apparatus.

7. A camera registering apparatus comprising:
a power over Ethernet (PoE) port configured to receive a first camera registration request from a first camera forming a first network;
a network port configured to receive a second camera registration request from a second camera forming a second network different from the first network;
a processor configured to, when an allocable channel exists, register the first camera or the second camera in the allocable channel according to an order of receiving the first camera registration request and the second camera registration request; and
a viewer port configured to receive certain channel identification information indicating a certain channel from a client terminal, transmit a camera detail information input request corresponding to the certain channel to the client terminal, and receive first camera detail information about the first camera or second camera detail information about the second camera from the client terminal,
wherein the processor is further configured to register the first camera or the second camera in the certain channel according to the certain channel identification information and the first camera detail information, or the certain channel identification information and the second camera detail information.

8. The camera registering method of claim 7, wherein the first camera registration request comprises first channel identification information, and wherein the method further comprises: in response to receiving the first camera registration request prior to the second camera registration request, registering, by the processor, the first camera in a first channel indicated by the first channel identification information; and registering, by the processor, the second camera in a second channel different from the first channel.

9. The camera registering method of claim 8, wherein the first channel identification information indicates a port number of the PoE port that receives the first camera registration request from the first camera, from among a plurality of PoE ports provided in the camera registering apparatus.

10. A camera registering method performed by a camera registration apparatus comprising a processor, a power over Ethernet (PoE) port, and a network port, the method comprising:
   receiving, at the POE port, a first camera registration request from a first camera forming a first network;
   receiving, by the network port, a second camera registration request from a second camera forming a second network different from the first network; and
   when an allocable channel exists, registering, by the processor, the first camera or the second camera in the allocable channel according to an order of receiving the first camera registration request and the second camera registration request,
   wherein the first camera registration request comprises first channel identification information indicating a first channel, and
   wherein the method further comprises:
      in response to receiving the second camera registration request prior to the first camera registration request, registering, by the processor, the second camera in the first channel,
      transmitting, by a viewer port provided in the camera registering apparatus, a registration confirmation request regarding the first channel for the first camera to a client terminal,
      receiving, by the viewer port, a registration affirmation response regarding the first channel for the first camera from the client terminal; and
      deregistering, by the processor, the second camera from the first channel and registering the first camera in the first channel.

11. The camera registering method of claim 10, further comprising:
   receiving, by the viewer port, a registration negation response regarding the first channel for the first camera from the client terminal;
   transmitting, by the viewer port, a registration confirmation request regarding a second channel for the first camera to the client terminal;
   receiving, by the viewer port, a registration affirmation response regarding the second channel for the first camera from the client terminal; and
   registering, by the processor, the first camera in the second channel,
   wherein the second channel is a channel different from the first channel.

12. The camera registering method of claim 11, wherein the registration confirmation request regarding the second channel for the first camera comprises information about at least one allocable channel, and
   wherein the registration affirmation response regarding the second channel for the first camera comprises a user input of selecting one of the at least one allocable channel.

13. The camera registering method of claim 10, wherein the first network is a local area network (LAN) and the second network is a wide area network (WAN).

14. A camera registering method performed by a camera registration apparatus comprising a processor, a power over Ethernet (PoE) port, and a network port, the method comprising:
   receiving, at the POE port, a first camera registration request from a first camera forming a first network;
   receiving, by the network port, a second camera registration request from a second camera forming a second network different from the first network; and
   when an allocable channel exists, registering, by the processor, the first camera or the second camera in the allocable channel according to an order of receiving the first camera registration request and the second camera registration request;
   receiving, by a viewer port provided in the camera registering apparatus, certain channel identification information indicating a certain channel, from a client terminal;
   transmitting, by the viewer port, a camera detail information input request corresponding to the certain channel to the client terminal;
   receiving, by the viewer port, camera detail information about a certain camera corresponding to the certain channel from the client terminal; and
   registering, by the processor, the certain camera in the certain channel,
   wherein the certain camera is the first camera or the second camera.

* * * * *